United States Patent
Hill et al.

(10) Patent No.: US 9,777,561 B2
(45) Date of Patent: Oct. 3, 2017

(54) THREADED CONNECTORS BETWEEN SUBMERSIBLE WELL PUMP MODULES

(71) Applicant: Baker Hughes Incorporated, Houston, TX (US)

(72) Inventors: Jason Eugene Hill, Catoosa, OK (US); Brown Lyle Wilson, Tulsa, OK (US); Ryan P. Semple, Owasso, OK (US); John Jay Mack, Catoosa, OK (US); Scott C. Strattan, Broken Arrow, OK (US); Kenneth W. O'Grady, Collinsville, OK (US)

(73) Assignee: Baker Hughes Incorporated, Houston, TX (US)

( * ) Notice: Subject to any disclaimer, the term of this patent is extended or adjusted under 35 U.S.C. 154(b) by 385 days.

(21) Appl. No.: 14/585,949

(22) Filed: Dec. 30, 2014

(65) Prior Publication Data

US 2015/0184670 A1    Jul. 2, 2015

Related U.S. Application Data

(60) Provisional application No. 61/922,479, filed on Dec. 31, 2013.

(51) Int. Cl.
| | |
|---|---|
| *F04D 13/10* | (2006.01) |
| *F04D 29/62* | (2006.01) |
| *F04D 29/42* | (2006.01) |
| *F16L 19/02* | (2006.01) |
| *F16L 19/00* | (2006.01) |
| *E21B 43/12* | (2006.01) |
| *F04D 13/02* | (2006.01) |
| *F04D 29/40* | (2006.01) |

(52) U.S. Cl.
CPC ............ *E21B 43/128* (2013.01); *F04D 13/02* (2013.01); *F04D 13/10* (2013.01); *F04D 29/628* (2013.01); *F04D 29/406* (2013.01); *F16L 19/005* (2013.01); *Y10T 29/49236* (2015.01)

(58) Field of Classification Search
CPC ........ F04D 13/10; F04D 13/08; F04D 13/086; F04D 29/628; F04D 29/62; F04D 29/086; F04D 29/406; F04D 29/605; F16L 19/005; F16L 19/02; F16L 19/0206; E21B 43/128; H02K 5/132
USPC ........ 417/423.3, 423.15, 424.2; 285/92, 389, 285/392
See application file for complete search history.

(56) References Cited

U.S. PATENT DOCUMENTS

| | | |
|---|---|---|
| 2,233,890 A | 3/1941 | Hoover |
| 3,390,371 A | 6/1968 | Kramer |

(Continued)

*Primary Examiner* — Peter J Bertheaud
(74) *Attorney, Agent, or Firm* — Bracewell LLP; James E. Bradley

(57) ABSTRACT

An electrical submersible pump assembly has modules including a pump, a motor, and a pressure equalizer. A first adapter having threads is mounted to one of the modules. A second adapter is mounted to an adjacent one of the modules, the second adapter having a tubular body, a neck, and an external shoulder at a base of the neck. A collar is rotatably carried on the neck and in threaded engagement with the threads of the first adapter. A clamp secures around the neck between the external shoulder and the collar after the collar is fully engaged with the threads on the first adapter. A pair of flanges are mounted to and extend outward from the clamp. A motor lead locates between the flanges.

20 Claims, 7 Drawing Sheets

(56) References Cited

U.S. PATENT DOCUMENTS

| | | | |
|---|---|---|---|
| 4,060,345 A | 11/1977 | Blum | |
| 4,154,302 A | 5/1979 | Cugini | |
| 4,627,490 A | 12/1986 | Moore | |
| 4,708,201 A | 11/1987 | Reed | |
| 4,728,296 A | 3/1988 | Stamm | |
| 4,801,160 A * | 1/1989 | Barrington | F16L 19/0218 285/110 |
| 5,343,942 A | 9/1994 | Serra et al. | |
| 5,380,158 A | 1/1995 | Gerbitz | |
| 6,557,905 B2 * | 5/2003 | Mack | F04D 29/044 285/330 |
| 6,883,604 B2 * | 4/2005 | Mack | F04D 13/10 166/105 |
| 7,810,557 B2 * | 10/2010 | Ives | F04D 13/10 166/105 |
| 8,419,390 B2 * | 4/2013 | Merrill | E21B 43/128 417/423.11 |
| 2015/0130185 A1 * | 5/2015 | Knapp | F16L 19/0231 285/330 |
| 2016/0024860 A1 * | 1/2016 | Semple | E21B 17/1035 166/386 |

\* cited by examiner

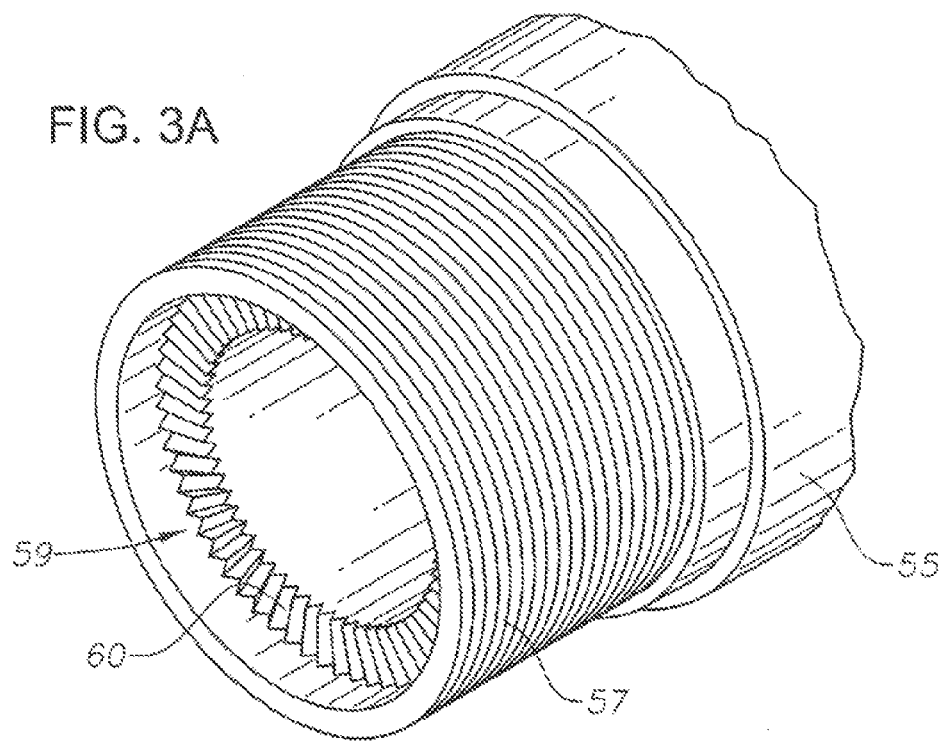
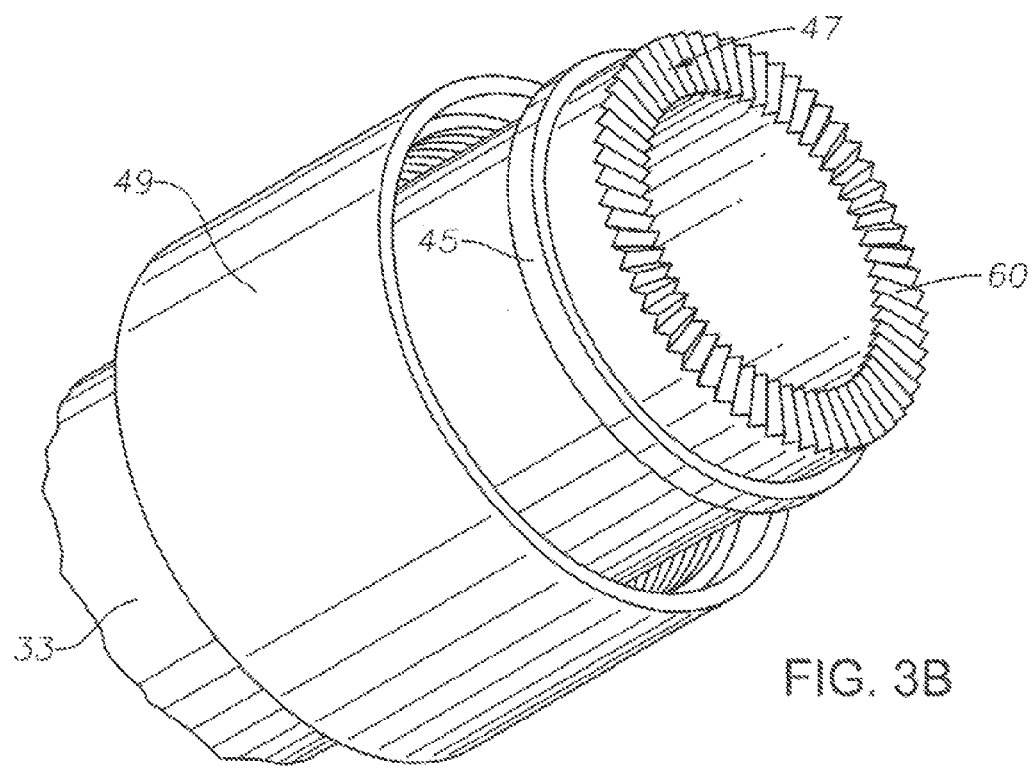

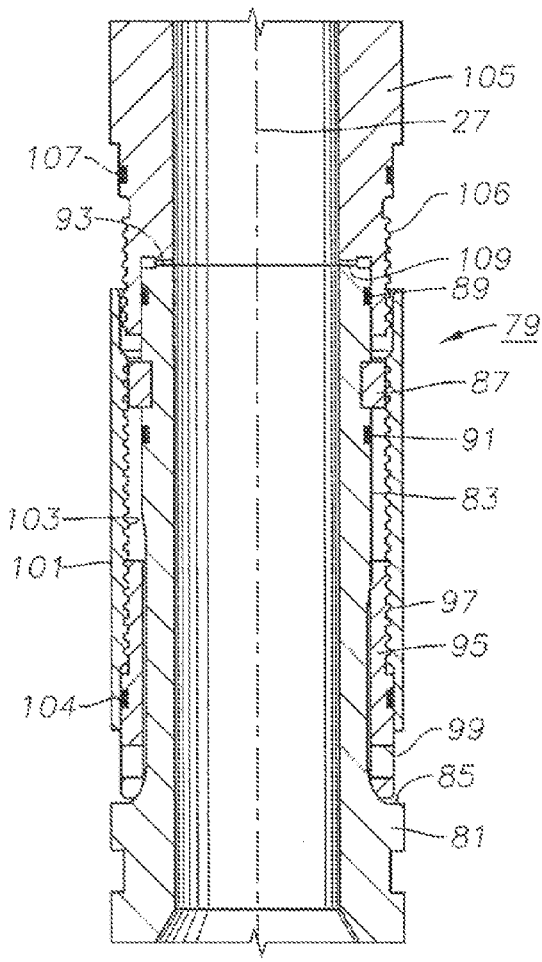
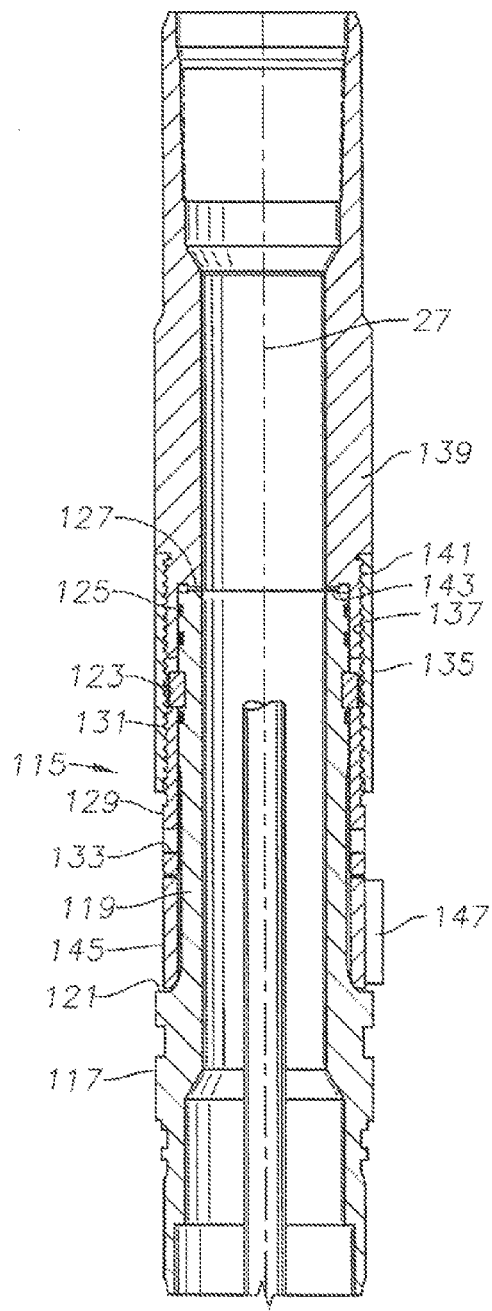
FIG. 8
FIG. 9

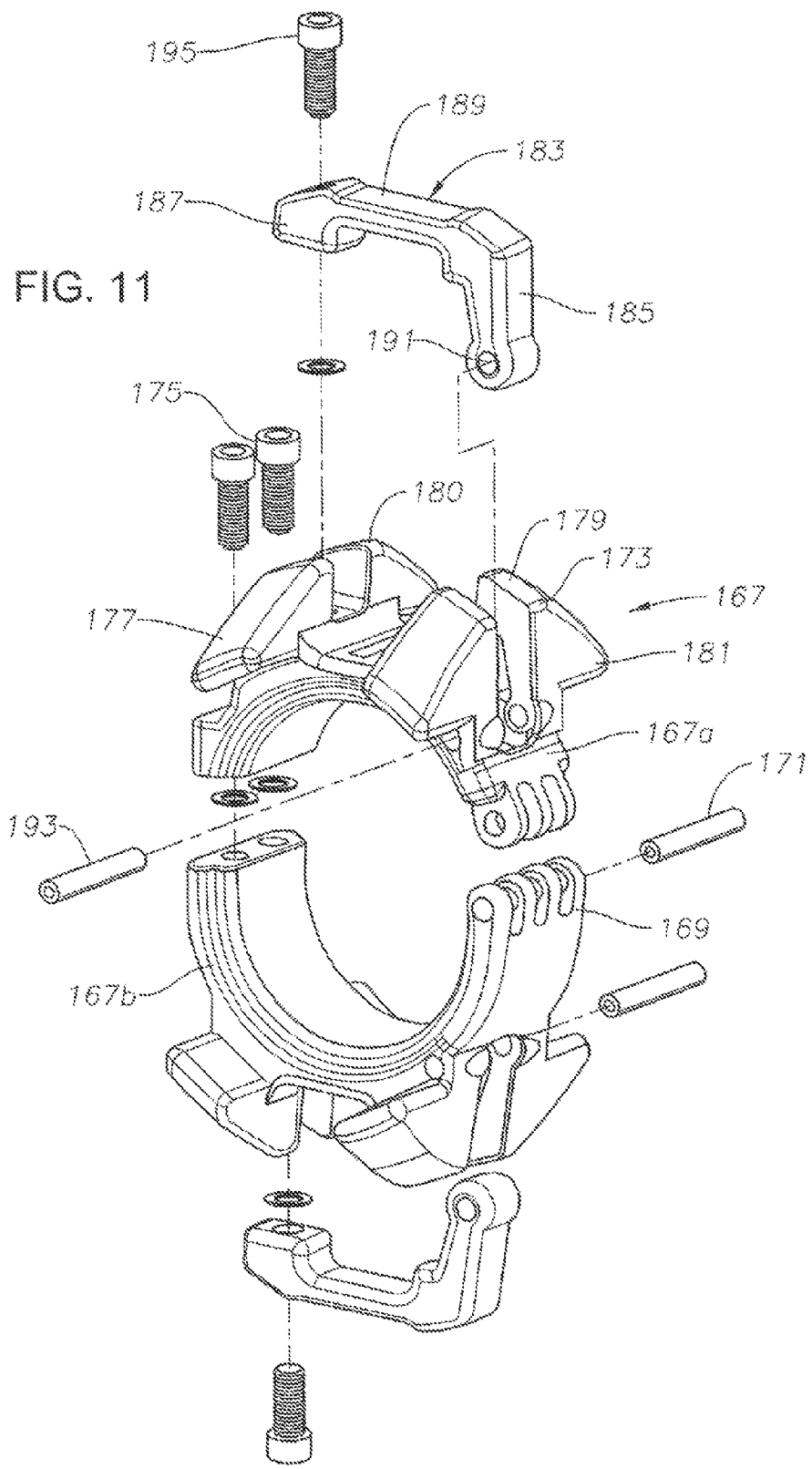

THREADED CONNECTORS BETWEEN SUBMERSIBLE WELL PUMP MODULES

CROSS REFERENCE TO RELATED APPLICATION

This application claims priority to provisional application 61/922,479, filed Dec. 31, 2013.

FIELD OF THE DISCLOSURE

This disclosure relates in general to submersible well pump assemblies and in particular to threaded connections between the modules of the pump assemblies.

BACKGROUND

Submersible well pump assemblies (ESP) are commonly used to pump well fluid from oil wells. A typical ESP includes a pump and an electrical motor. The pump may be a centrifugal motor having a large number of stages, each stage comprising an impeller and a diffuser. Alternately, the pump may be another type, such as a progressing cavity pump. An ESP includes a pressure equalizer that couples to the motor to reduce a pressure difference between dielectric lubricant in the motor and the hydrostatic pressure of the well fluid. The ESP may include other components, such as a gas separator and additional motors and pumps in tandem. The various components are normally brought to a well site in separate modules, then secured together.

Generally the modules of the ESP are connected together by bolts that secure mating flanges. In some wells, a vertical section leads around a bend to an inclined or horizontal section. Inserting a lengthy ESP around the bend can cause stresses to the bolts.

It has been proposed instead of bolted flanges to employ threaded collars that are rotated to secure the various modules of the ESP. An example of a threaded collar arrangement is shown in U.S. Pat. No. 6,557,905. The threaded collar fits around a neck of an adapter of one of the modules and engages threads on the adapter of the other module. One concern is the possibility of vibration during operation causing the collar to loosen or back off from the threaded engagement.

SUMMARY

An electrical submersible pump assembly has a plurality of modules including a pump, a motor, and a pressure equalizer mounted to the motor for reducing a pressure differential between lubricant in the motor and hydrostatic pressure of well fluid. A threaded connection connects ends of adjacent ones of the modules together. The threaded connection includes a first adapter having threads. A second adapter has a tubular body, a neck of smaller diameter than the body, and an external shoulder at a junction of the neck with the body. An external shoulder ring is located on the neck. A collar is rotatably carried on the neck and in threaded engagement with the threads of the first adapter. The collar has an abutment surface that abuts against the shoulder ring. A collar retainer secures to the neck between the external shoulder and the collar after the collar is fully engaged with the threads of the first adapter to prevent the collar from unscrewing from the threads during operation of the assembly.

The collar has a second adapter end axially spaced from the external shoulder by a selected distance when the collar is fully engaged with the threads of the first adapter. The collar retainer has an axial length substantially the same as the selected distance.

Preferably, the collar retainer comprises a clamp that secures around the neck. A pair of flanges protrude outward from the flange clamp. A motor lead extends alongside the threaded connection between the flanges. Each of the flanges may have an outer surface with a second tapered section that tapers inwardly in a direction toward the second adapter. Each of the flanges may also have an outer surface with a first tapered section that tapers inwardly in a direction toward the first adapter.

In one embodiment, an arm is mounted to the clamp, the arm being securable in a retaining position across outer surfaces of the flanges after the motor lead is inserted between the flanges to retain the motor lead between the flanges. The arm has a central portion and first and second ends that secure the arm to the clamp. The first end extends into a first slot in one of the flanges, and the second end extends into the second slot in the other of the flanges. The central portion extends between the flanges and has an outer surface flush with outer surfaces of the flanges.

BRIEF DESCRIPTION OF THE DRAWINGS

So that the manner in which the features, advantages and objects of the disclosure, as well as others which will become apparent, are attained and can be understood in more detail, more particular description of the disclosure briefly summarized above may be had by reference to the embodiment thereof which is illustrated in the appended drawings, which drawings form a part of this specification. It is to be noted, however, that the drawings illustrate only a preferred embodiment of the disclosure and is therefore not to be considered limiting of its scope as the disclosure may admit to other equally effective embodiments.

FIGS. 3A and 3B are perspective views of upper and lower adapters of the threaded connection of FIG. 2.

FIG. 8 is a sectional view of the second embodiment of the threaded connection of FIG. 6, with the threaded collar shown in a disengaged position.

FIG. 9 is a sectional view of a third embodiment of a threaded connection for the pump assembly of FIG. 1.

FIG. 11 is an exploded perspective view of another alternate embodiment of a clamp for the pump assembly of FIG. 1.

DETAILED DESCRIPTION OF THE DISCLOSURE

Figure 1:
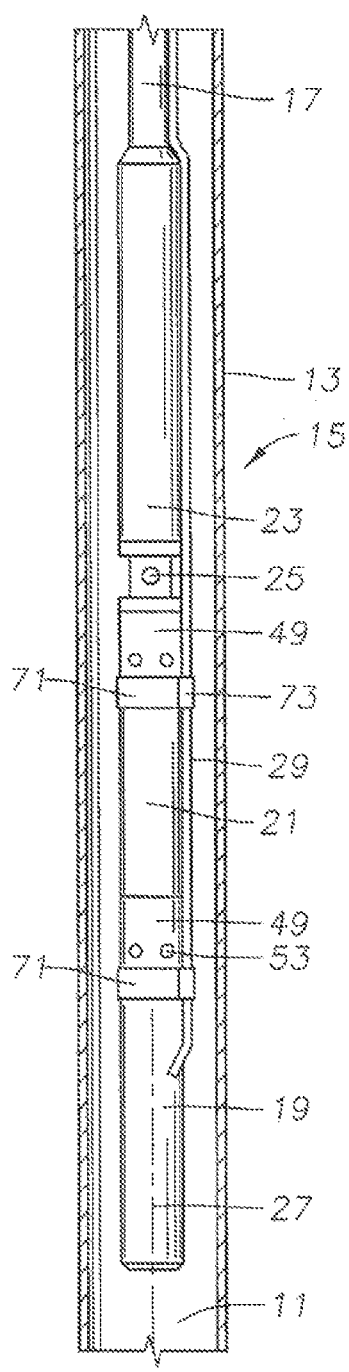
FIG. 1 is a side view of an electrical submersible pump assembly in accordance with this disclosure and installed in a well.
Figure 2:
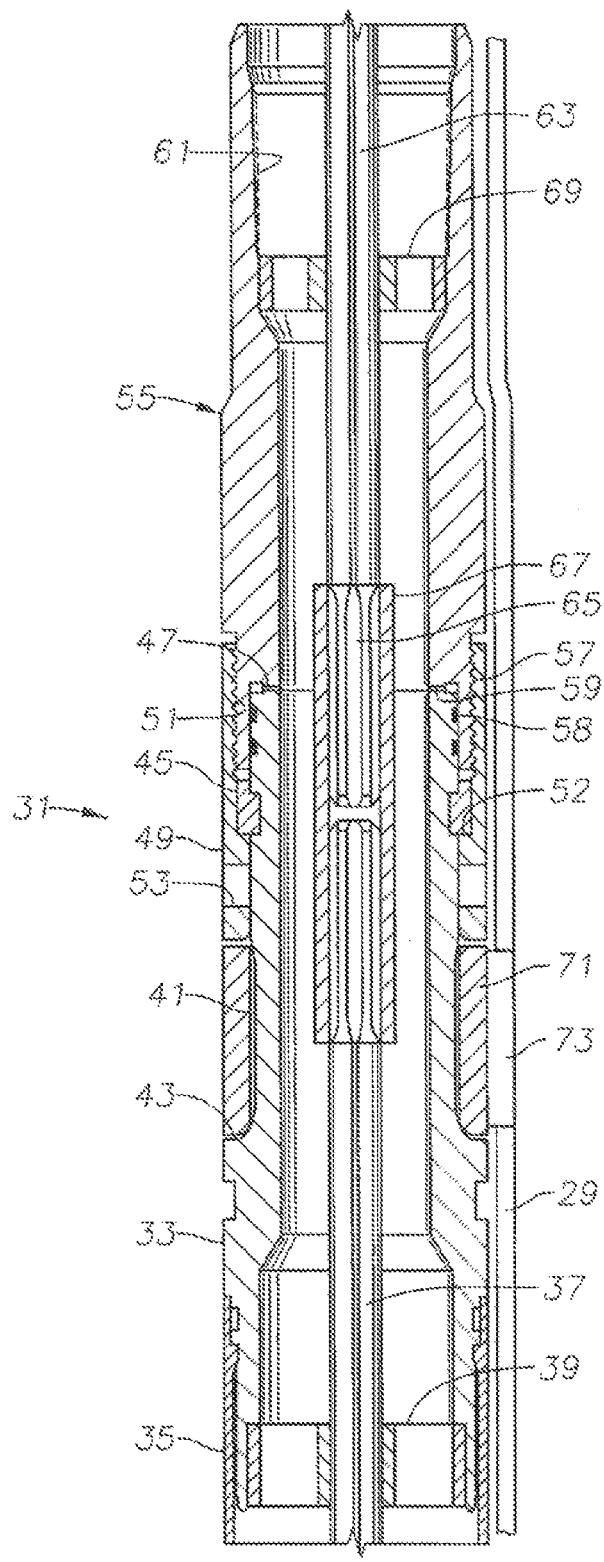
FIG. 2 is a sectional view of a first embodiment of one of the threaded connections of the pump assembly of FIG. 1.

The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1, a well 11 has casing 13 that is perforated or has openings to admit well fluid. A pump assembly 15 is illustrated as being supported on production tubing 17 extending into well 11. Alternately, pump assembly 15 could be supported by other structure, such as coiled tubing. Although shown installed vertically, pump assembly 15 could be located within an inclined or horizontal section of well 11. Pump assembly 15 has several modules, including a motor 19, normally a three-phase electrical motor. A motor pressure equalizer or seal section 21 connects to the upper end of motor 19 and has components, such as a bladder, for reducing a pressure differential between lubricant in motor 19 and the hydrostatic pressure of well fluid. Alternately pressure equalizer 21 could be mounted to a lower end of motor 19. A pump 23 with a well fluid intake 25 connects to the upper end of seal section 21. Pump 23 may be a rotary pump, such as a centrifugal or progressing cavity pump, or some other type of pump. In addition to motor 19, seal section 21 and pump 23, pump assembly 15 could have other modules, including a gas separator.

Pump assembly 15 has a longitudinal axis 27. A motor lead 29 for supplying power to motor 19 connects or is part of a power cable that extends down from a wellhead (not shown) alongside production tubing 17. Motor lead 29 extends alongside pump assembly 15 to a connector at the upper end of motor 19.

Pump assembly 15 may be lengthy, particularly if tandem motors 19 and a gas separator are employed with a pump 23 having many stages. The diameter of pump assembly 15 is much less than the length. While installing in an inclined section of a well, pump assembly 15 must be able to flex or resiliently bend along its axis 27 as it moves through a bend (not shown) in casing 13 from the vertical to an inclined portion of well 11.

In this disclosure, one or more of the connections between the modules is a threaded connection 31, rather than a bolted connection. FIGS. 2-6 illustrate a first embodiment of threaded connection 31, which includes a first or lower adapter 33. The terms "upper", "lower" and the like are used herein only for convenience, since pump assembly 15 may be operated horizontally, or connection 31 inverted from as shown in FIGS. 2-6. Lower adapter 33 is illustrated as being secured to internal threads of a housing 35 of one of the modules. Lower adapter 33 could alternately be connected to external threads of one of the modules.

The module to which lower adapter 33 connects has a separate drive shaft 37 extending along axis 27. Motor 19 (FIG. 1) rotates drive shaft 37, and radial bearings 39 support drive shaft 37 within lower adapter 33. Lower adapter 33 comprises a tubular body with a neck 41 of reduced outer diameter. Neck 41 defines an external upward facing shoulder 43 at its base or junction with the tubular body. A shoulder ring 45, which may be in two pieces or segments, fits within a circumferential external groove on neck 41 above lower adapter shoulder 43. Lower adapter 33 has a rim 47 on the upper end of neck 41.

A tubular collar 49 fits around neck 41 Collar 49 is illustrated as having internal threads 51 within an upper portion. An abutment surface, which is an upward facing internal shoulder 52 in this embodiment, is located in the bore of collar 49 below threads 51. Internal shoulder 52 abuts shoulder ring 45 in this embodiment. Collar 49 may have a number of spanner holes or recesses 53 spaced around its circumference for being engaged by a spanner wrench.

Threaded connection 31 has a second or upper adapter 55, which is a tubular body with external threads 57 on its lower end. When connection 31 makes up, the upper portion of lower adapter neck 41 stabs into a counterbore of upper adapter 55. A pair of seals 58 on neck 41 sealingly engage the counterbore of upper adapter 55 at a point radially inward from upper adapter external threads 57. Upper adapter 55 has a shoulder 59 on its lower end that may abut lower adapter rim 47 when connection 31 makes up.

Lower adapter 33 and upper adapter 55 have mating anti-rotations surfaces that engage each other to prevent relative rotation when connection 31 is made up. As shown in FIGS. 3A and 3B, in this embodiment, shoulder 59 and rim 47 have mating teeth 60 that mesh when connection 31 makes up to prevent rotation of lower adapter 33 and upper adapter 55 relative to each other. Alternately, knurling or other friction enhancing techniques on anti-rotation shoulder 59 and rim 47 could be employed. Also, as another alternate, the anti-rotation surfaces could comprise other structure that prevents rotation of lower adapter 3 and upper adapter 55 when made up.

Referring again to FIG. 2, in this example, upper adapter 55 has internal threads 61 on its upper end for connecting to another one of the modules. Alternately, external threads could be employed. The module that upper adapter 55 connects to has a separate drive shaft 63 for coupling with drive shaft 37. Each drive shaft 37, 63 has a splined end 65; splined ends 65 are closely spaced to each other or in abutment when connector 31 is made up. Optionally, a latch mechanism may be employed to latch splined ends 65 together when made up so as to transmit tension. A tubular spline coupling 67 with internal splines engages both splined ends 65 to transmit torque between drive shafts 37, 63. Drive shaft 37 may be supported in upper adapter 55 with radial bearings 69.

Neck 41 of lower adapter 33 has a length selected to provide an exposed portion between lower adapter shoulder 43 and the lower end of collar 49 after collar 49 is fully made up. A collar retainer mounts to the space between collar 49 and external shoulder 43 to prevent collar 49 from coming unscrewed due to vibration of pump assembly 15 during operation. In this embodiment, the collar retainer comprises a flange clamp 71 that clamps around the exposed portion of neck 41. Flange clamp 71 preferably has an axial length slightly less than an axial distance from lower adapter shoulder 43 to the lower end of collar 49. If collar 49 begins to loosen, it can move toward external shoulder 43 a very short distance, if at all, before it contacts flange clamp 71. Unscrewing rotation will stop once collar 49 contacts flange clamp 71.

Figure 4:
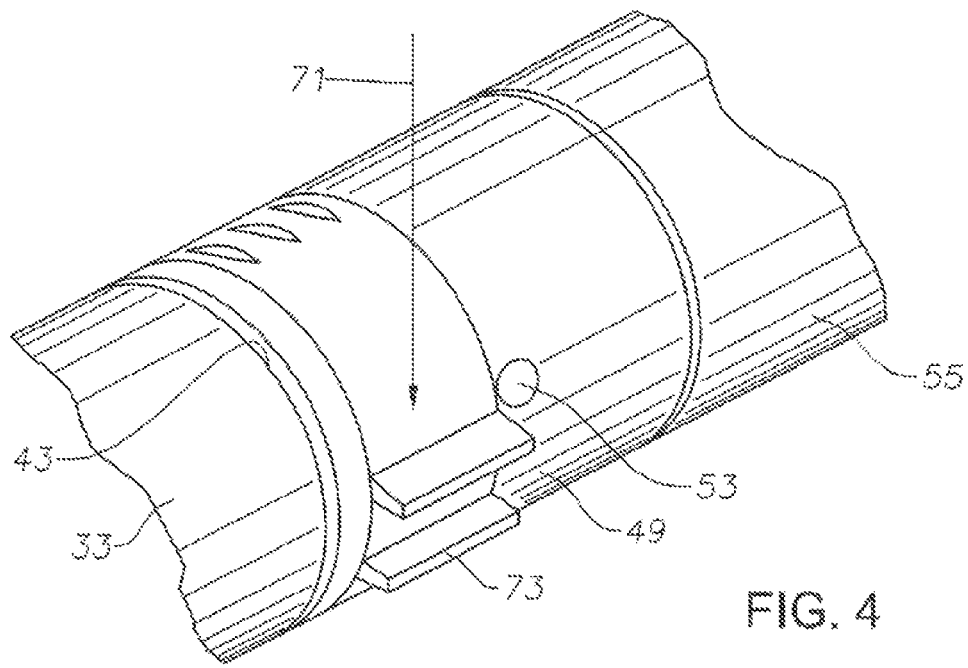
FIG. 4 is a perspective view of a portion of the threaded connection of FIG. 2.
Figure 5:
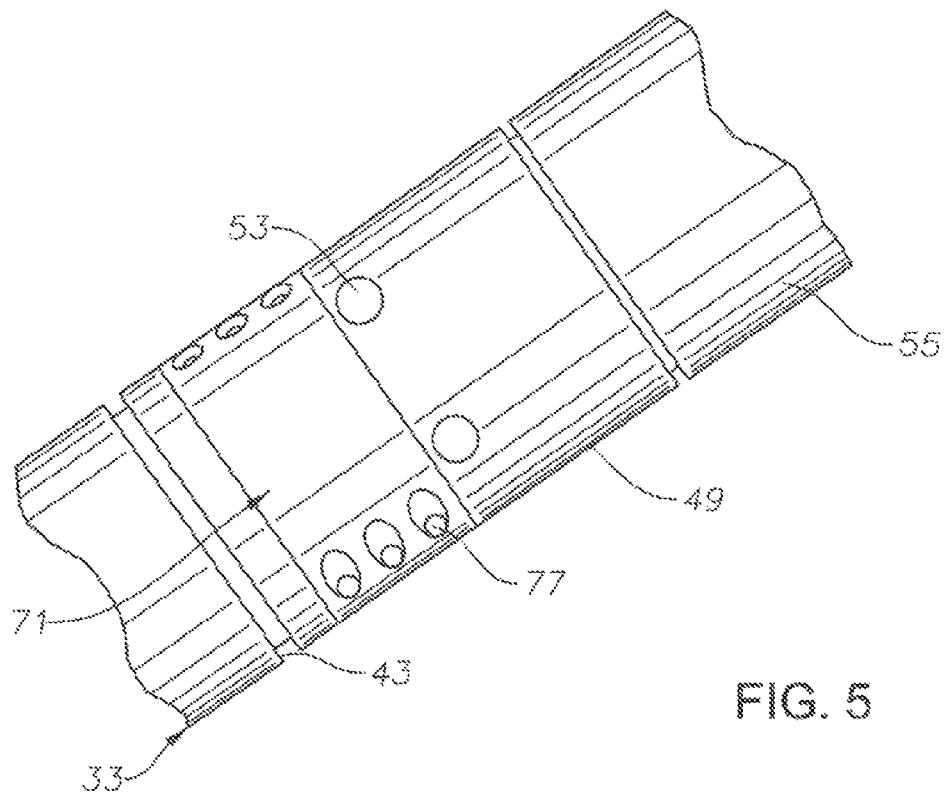
FIG. 5 is another perspective view of the portion of the threaded connection shown in FIG. 4.

As shown in FIG. 4, flange clamp 71 has a pair of radially extending flanges 73 extending outward from its outer surface. Motor lead 29 (FIG. 1) fits between flanges 73, which provide protection for motor lead 29 while pump assembly 15 is being lowered into well 11. Flange clamp 71 is a two piece member bolted together with bolts 77, as shown in FIG. 5. Once installed, flange clamp 71 prevents collar 49 from backing off its connection with upper adapter threads 57 in the event collar 49 loosens due to vibration.

Workers assemble two modules having a threaded connection 31 by aligning the splines on splined ends 65 of shafts 37, 63 with each other, then moving lower adapter 33 and upper adapter 55 toward each other along axis 27. The workers will have previously installed spline coupling 67 on one of the splined ends 65. Once stabbed into engagement, splined ends 65 will be joined by spline coupling 67, and neck rim 47 may be in abutment with shoulder 59. Teeth 60 (FIGS. 3A and 3B) will mesh to prevent rotation.

Figure 6:
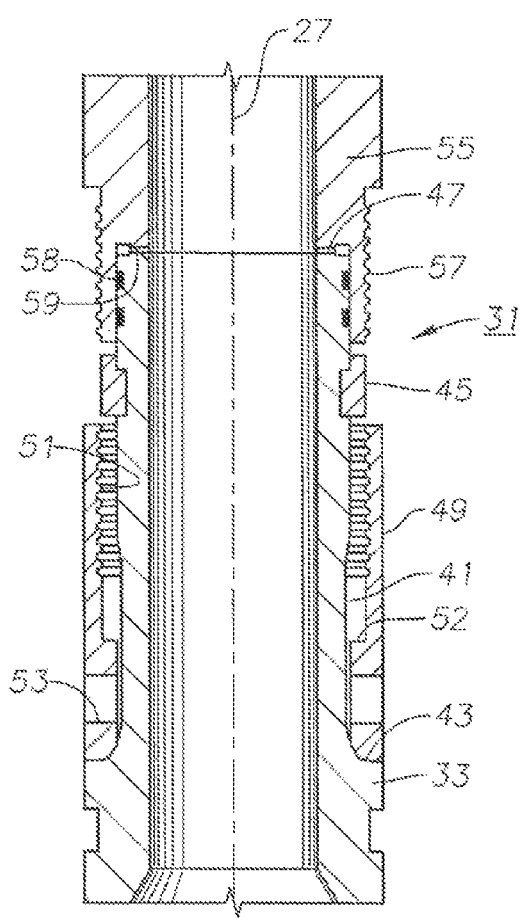
FIG. 6 is a sectional view of the first embodiment of the threaded connection of FIG. 2, with the threaded collar shown in a disengaged position.

FIG. 6 illustrates adapters 33, 55 stabbed into engagement with each other prior to securing collar 49 to upper adapter threads 57. FIG. 6 does not show shafts 37, 63. The workers then rotate collar 49 relative to adapters 33, 55, causing collar threads 51 to make up to upper adapter threads 57. When fully made up, collar internal shoulder 52 will be in abutment with the lower side of shoulder ring 45. The operators then secure flange clamp 71 to neck 41 with bolts 77 (FIG. 5). The workers position motor lead 29 (FIG. 1) between flanges 73.

Figure 7:
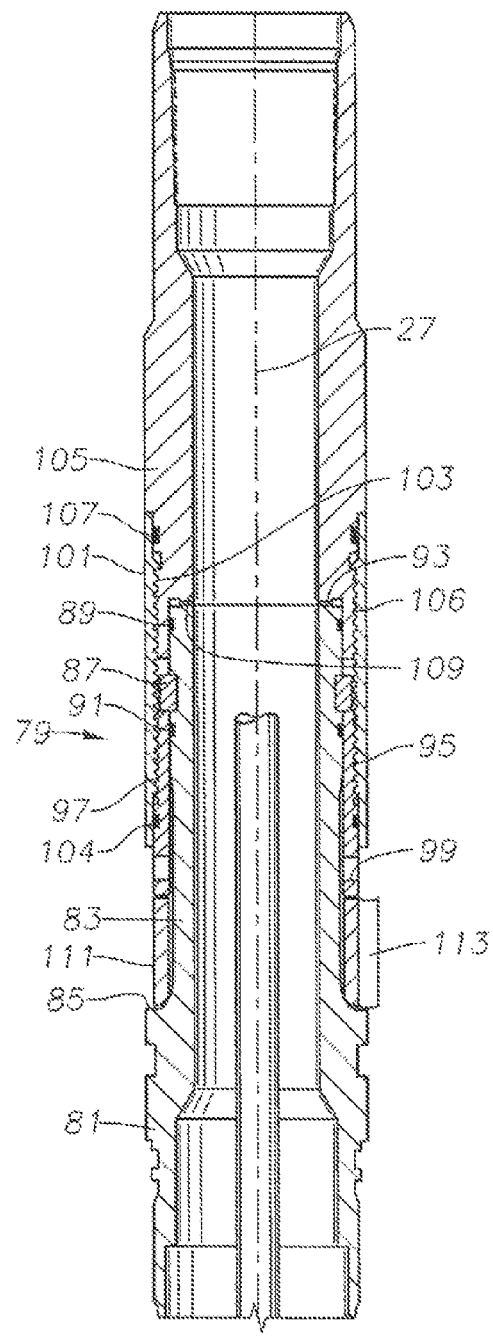
FIG. 7 is a sectional view of a second embodiment of a threaded connection for the pump assembly of FIG. 1.

FIGS. 7 and 8 illustrate a second embodiment of a threaded connection 79, with the drive shafts not being shown. Threaded connection 79 has a lower adapter 81 that secures to a lower module. Lower adapter 81 has a neck 83 that extends upward from a lower adapter shoulder 85. A shoulder or split ring 87 secures to a circumferential groove on neck 83. Lower adapter 81 has seals 89, 91 on the exterior of neck 83. Split ring 87 locates between seals 89, 91. Lower adapter 81 has a rim 93 on its upper end, which may have anti-rotation enhancements, such as teeth 60 (FIG. 3B).

A collar 95 fits around neck 83. Collar 95 in this embodiment has external threads 97, rather than internal threads as in collar 49 of FIG. 2. Also, the upper end of collar 95 serves as an abutment surface to abut split ring 87, rather than an internal shoulder 52 as in the first embodiment. Spanner holes 99 may be placed in collar 95 for receiving a spanner wrench. When made up, lower adapter seal 91 seals against an inner diameter of collar 95.

An extension sleeve 101, which may be considered to be part of collar 95, has internal threads 103 that secure to collar 95. Extension sleeve 101 extends upward past collar 95, and a seal 104 on collar 95 seals against extension sleeve 101 below internal threads 103. The upper portion of extension sleeve threads 103 secure to external threads 106 on an upper adapter 105. Upper adapter 105 has a seal 107 that seals to the inner diameter of extension sleeve 101 above threads 103, 106. Upper adapter 105 may have an anti-rotation shoulder 109 with friction enhancements that mates with lower adapter rim 93. Once made up, a flange clamp 111 with flanges 113 similar to flange clamp 71 (FIG. 4) fits around neck 83 between shoulder 85 and the lower end of collar 95.

Referring to FIG. 8, during assembly, extension sleeve 101 may be tightly secured to collar 95 before extension sleeve 101 is secured to upper adapter threads 106. An anti-rotation key (not shown) could be installed between collar 95 and extension sleeve 101. During stab in, collar 95 may be resting on lower adapter shoulder 85. After stab in, the worker rotates collar 95 and extension sleeve 101 in unison to make extension sleeve 101 up with upper adapter threads 106. Once made up, as shown in FIG. 7, the upper end of collar 95 abuts split ring 87. The worker then installs clamp 111, which prevents collar 95 and extension sleeve 101 from backing out. When installed in well 11 (FIG. 1), seals 97 and 107 prevent entry of well fluid into contact with threads 103, 106 and 97. Seals 89 and 91 block production fluid within the bore of threaded connection 79 from entry into threads 103, 106 and 97.

Referring to the second alternate embodiment of FIG. 9, threaded connection 115 includes a lower adapter 117 with a neck 119 extending upward from a lower adapter shoulder 121. A split ring 123 fits within a groove on neck 119 above lower adapter shoulder 121. Lower adapter 117 has a pair of seals 125 located above split ring 123 on neck 119 below rim 127. Unlike seals 89, 91 of FIG. 7, both seals 125 are located above split ring 123.

A collar 129 with external threads 131 fits around neck 119. Collar 129 may have spanner wrench holes 133. An extension sleeve 135 with internal threads 137 secures to collar external threads 131 in the same manner as extension sleeve 101 and collar 95 of FIGS. 7 and 8. Internal threads 137 extend above collar 129 past split ring 123 and secure to external threads 141 of an upper adapter 139. Unlike the embodiment of FIGS. 7 and 8, there are no seals between extension sleeve 135 and collar 129 or between extension sleeve 135 and upper adapter 139. Upper adapter 139 has an anti-rotation shoulder 143 that has friction enhancements and engages lower adapter rim 127. Once made up, a flange clamp 145 may be installed around neck 119 between lower adapter shoulder 121 and collar 129. The embodiment of FIG. 9 assembles in the same manner as the embodiment of FIGS. 7 and 8.

Figure 10:
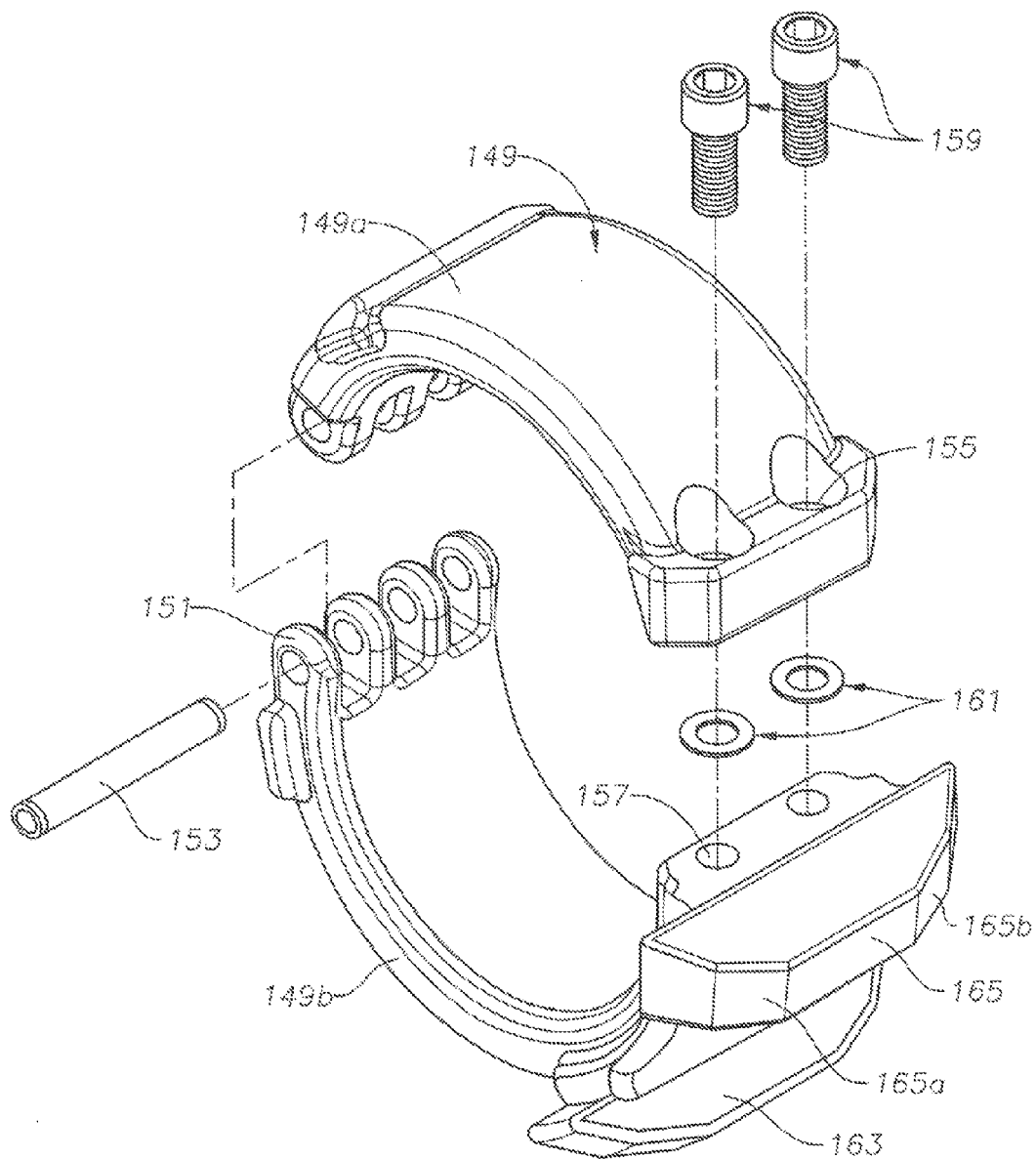
FIG. 10 is an exploded perspective view of an alternate embodiment of a clamp for the pump assembly of FIG. 1.

FIG. 10 shows another embodiment of a flange clamp 149. Flange clamp 149 has two partially circumferential segments 149a, 149b that are joined on one side edge by a hinge 151. A hinge pin 153 fits through the devises of hinge 151 to pivotally retain segments 149a, 149b. Bolt holes 155 at an opposite side edge of segment 149a align with threaded holes 157 in a side edge of segment 149b. Bolts 159 extend through holes 155 and engage threaded holes 157 to secure clamp 149 tightly around an adapter neck, such as neck 41 of FIG. 2. Washers 161 are positioned between holes 155 and 157.

Flange clamp 149 has a pair of flanges 163 extending outward from clamp segment 149b. Flanges 163 are circumferentially spaced apart from each other a distance slightly greater than the width of motor lead 29 (FIG. 2) so as to receive motor lead 29 between them. Flanges 163 have outer surfaces 165 that extend outward from clamp segment 149b a distance greater than a radial thickness of motor lead 29. Outer surfaces 165 preferably have first and second beveled or tapered end portions 165a, 165b. Each tapered end portion 165a, 165b tapers inward from a mid-section of flange 163 until reaching one of the ends of flange 163. During installation of the pump assembly in a well, one of the tapered end portions 165a, 165b will be facing downward and the other upward. The one facing downward reduces the chances for flanges 163 snagging on structure in the well while being lowered into the well. Similarly, the one facing upward reduces the chances for flanges 163 snagging on structure in the well while the pump assembly is being retrieved.

In this example, the total axial length of each flange 163 from end to end is greater than the axial width or dimension of each clamp segments 149a, 149b from an upper to a lower edge. The axial width of clamp segments 149a, 149b is approximately the same as the distance between external shoulder 43 (FIG. 2) and collar 49 when collar 49 is fully made up with threads 57. In the FIG. 10 embodiment, flanges 163 are located closer to the side edge containing threaded holes 157 than to the side edge containing hinge 151; however the positioning of flanges 163 can vary.

In the embodiment of FIG. 11, clamp 167 also has two clamp segments 167a and 167b secured at one side edge by a hinge 169 and pin 171. In this embodiment, two pairs of flanges 173 are illustrated, each protruding from a different one of the clamp segments 167a, 167b. One pair of flanges 173 could provide protection for motor lead 29 (FIG. 2), while the other could optionally provide protection for other things, such as chemical injection lines or hydraulic flow lines. Clamp segments 167a, 167b are secured tightly around neck 41 (FIG. 2) with bolts 175. Flanges 173 have outer surfaces 177 that taper at upper and lower end portions in the same manner as tapered surfaces 165a, 165b of FIG. 10. Flanges 173 have greater axial lengths than the axial dimension of clamp segments 167a, 167b. The axial dimension of clamp segments 167a, 167b may be the same as in the embodiment of FIG. 10.

A slot 179 extends through a mid-section of one flange 173 between opposite flange ends 181, and another slot 180 extends through a mid-section of the adjacent flange 173. Each slot 179, 180 extends outward from one of the clamp segments 167a, 167b. An arm 183 has a first end 185 that extends into slot 179 and a second end 187 that extends into slots 180 of each pair of flanges 173. Each end 185, 187 angles inward from a central portion 189 of arm 183, and end 185 may be longer than end 187. End 185 has a hole 191 that receives a pivot pin 193, which also extends through a mating hole on each clamp segment 167a, 167b. Bolts 195 secure second end 187 in slot 180.

Pivot pin 193 allows arm 183 to swing between a closed position and an open position. In the closed position, central portion 189 extends between flanges 173, retaining motor lead 29 (FIG. 2) between flanges 173. An outer surface of central portion 189 will be flush with outer surfaces 177 of flanges 173 in the closed position. In the open position, arm 183 swings outward to position motor lead 29 between flanges 173.

While the invention has been shown in several embodiments, it should be apparent to those skilled in the art that it is not so limited but is susceptible to various changes.

The invention claimed is:

1. An electrical submersible pump assembly, comprising:
a plurality of modules including a pump, a motor, and a pressure equalizer mounted to the motor for reducing a pressure differential between lubricant in the motor and hydrostatic pressure of well fluid;
a threaded connection between at least two of the modules, comprising:
a first adapter having threads;
a second adapter having a tubular body, a neck of smaller diameter than the body, and an external shoulder at a junction of the neck with the body, the neck having a longitudinal axis;
an external shoulder ring on the neck;
a collar rotatably carried on the neck and in threaded engagement with the threads of the first adapter, the collar having an abutment surface that abuts against the shoulder ring, the collar having a second adapter end axially spaced from the external shoulder by a selected distance when the collar is fully engaged with the threads; and
a clamp that secures around the neck, using a threaded fastener, between the external shoulder and the collar after the collar is fully engaged with the threads of the first adapter to prevent the collar from unscrewing from the threads of the first adapter during operation of the assembly, the clamp having an axial length substantially equal to the selected distance.

2. The assembly according to claim 1, wherein:
the clamp is a two-piece member secured together by the threaded fastener.

3. The assembly according to claim 1, wherein:
the clamp has an outer cylindrical surface with a diameter that is the same as an outer diameter of the collar.

4. The assembly according to claim 1, wherein:
a pair of flanges protrude outward from the clamp relative to the axis for receiving between the flanges a motor lead.

5. The assembly according to claim 1, wherein the clamp further comprises:
a pair of flanges protruding outward from the clamp relative to the axis; and wherein the assembly further comprises:
a motor lead extending alongside the threaded connection and between the flanges.

6. The assembly according to claim 1, wherein the clamp further comprises:
a pair of flanges protruding outward from the clamp relative to the axis, each of the flanges having an outer surface with a second tapered section that tapers inwardly in a direction toward the second adapter; and wherein the assembly further comprises:
a motor lead extending alongside the threaded connection and between the flanges.

7. The assembly according to claim 1, wherein the clamp further comprises:
a pair of flanges protruding outward from the clamp relative to the axis, each of the flanges having an outer surface with a first tapered section that tapers inwardly in a direction toward the first adapter, and a second tapered section that tapers inwardly in a direction toward the second adapter; and wherein the assembly further comprises:
a motor lead extending alongside the threaded connection and between the flanges.

8. The assembly according to claim 1, wherein the clamp further comprises:
a pair of flanges protruding outward from the clamp relative to the axis; wherein the assembly further comprises:
a motor lead extending alongside the threaded connection and between the flanges; and
an arm mounted to the clamp, the arm being securable in a retaining position across outer surfaces of the flanges after the motor lead is inserted between the flanges to retain the motor lead between the flanges.

9. The assembly according to claim 1, wherein the clamp further comprises:
first and second flanges protruding outward from the clamp relative to the axis;
first and second outwardly extending slots formed in the first and second flanges, respectively;
an arm having a central portion and first and second ends that secure the arm to the clamp, the first end extending into the first slot and the second end extending into the second slot, the central portion extending between the flanges and having an outer surface flush with outer surfaces of the flanges; and wherein the assembly further comprises:

a motor lead extending alongside the threaded connection through an opening defined by the first and second flanges, the clamp and the central portion of the arm.

10. An electrical submersible pump assembly, comprising:
a plurality of modules including a pump, a motor, and a pressure equalizer mounted to the motor for reducing a pressure differential between lubricant in the motor and hydrostatic pressure of well fluid;
a motor lead extending alongside at least some of the modules and connected to the motor for supplying power to the motor;
a first adapter mounted to one of the modules and having threads;
a second adapter mounted to an adjacent one of the modules, the second adapter having a tubular body, a neck of smaller diameter than the body, and an external shoulder at a base of the neck;
an external shoulder ring on the neck;
a collar rotatably carried on the neck and in threaded engagement with the threads of the first adapter, the collar having an abutment surface that abuts against the shoulder ring;
a clamp that secures around the neck between the external shoulder and the collar after the collar is fully engaged with the threads on the first adapter to prevent the collar from unscrewing from the threads during operation of the assembly; and
a pair of flanges mounted to and extending outward from the clamp, the motor lead being located between the flanges, which provide protection to the motor lead.

11. The assembly according to claim 10, wherein:
the collar has a second adapter end axially spaced from the external shoulder by a selected distance when the collar is fully engaged with the threads; and
the collar retainer has an axial length substantially equal to the selected distance.

12. The assembly according to claim 10, wherein:
each of the flanges has an outer surface with a second tapered section that tapers inwardly in a direction toward the second adapter.

13. The assembly according to claim 10, wherein:
each of the flanges has an outer surface with first tapered section that tapers inwardly in a direction toward the first adapter, and a second tapered section that tapers inwardly in a direction toward the second adapter.

14. The assembly according to claim 10, further comprising:
an arm mounted to the clamp, the arm being securable in a retaining position across outer surfaces of the flanges after the motor lead is inserted between the flanges to retain the motor lead between the flanges.

15. The assembly according to claim 10, further comprising:
the pair of flanges comprising a first flange and a second flange;
first and second outwardly extending slots formed in the first and second flanges, respectively;
an arm having a central portion and first and second ends, the first end extending into the first slot and being pivotally secured to the clamp, the second end extending into the second slot and being securable to the clamp; and
the arm being pivotal about the first end between a closed position extending across the flanges radially outward from the motor lead to retain the motor lead between the flanges, and an open position allowing the motor lead to be inserted between the flanges.

16. The assembly according to claim 15, wherein the arm has an outer surface that is flush with outer surfaces of the flanges while in the closed position.

17. The assembly according to claim 10, wherein the flanges have axial lengths greater than an axial dimension of the clamp.

18. A method of pumping well fluid from a well, comprising:
(a) providing an electrical submersible pump assembly with a plurality of modules including a pump, a motor, and a pressure equalizer mounted to the motor;
(b) securing a first adapter having threads to one of the modules;
(c) securing a second adapter to an adjacent one of the modules, the second adapter having a tubular body, a neck of smaller diameter than the body, an external shoulder at a base of the neck, the neck having a longitudinal axis;
(d) inserting a collar over the neck, positioning a shoulder ring on the neck, abutting an abutment surface of the collar against the shoulder ring, and rotating the collar to secure the collar to the threads of the first adapter the collar having a second adapter end axially spaced from the external shoulder by a selected distance when the collar is fully engaged with the threads; then
(e) with a threaded fastener, securing a clamp around the neck between the external shoulder and the collar after the collar is fully engaged with the threads on the first adapter to prevent the collar from unscrewing from the threads of the first adapter during operation of the assembly, the clamp having an axial length substantially equal to the selected distance.

19. The method according to claim 18, wherein the clamp comprises:
a two-piece member that secures together with the threaded fastener.

20. The method according to claim 18, wherein step (a) comprises:
providing the clamp with a pair of outwardly extending flanges; and
positioning a motor lead for the motor between the flanges.

* * * * *